March 15, 1960  A. L. ABBOTT ET AL  2,928,706
DIAL SELECTOR CONSTRUCTION FOR FILING APPLIANCE
Filed Jan. 2, 1958  4 Sheets-Sheet 1
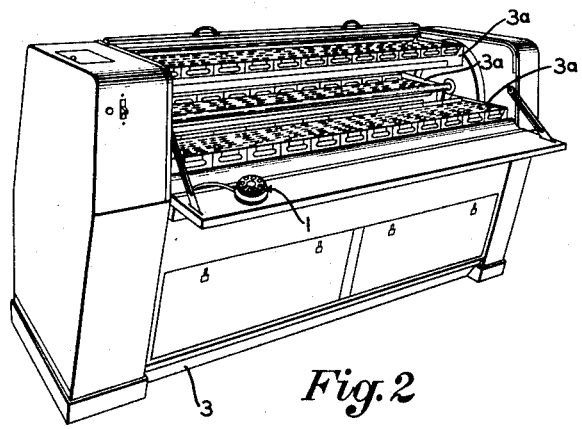
Fig. 2
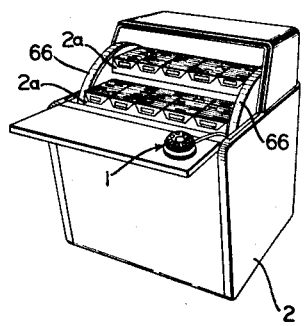
Fig. 1
Fig. 4
Fig. 3
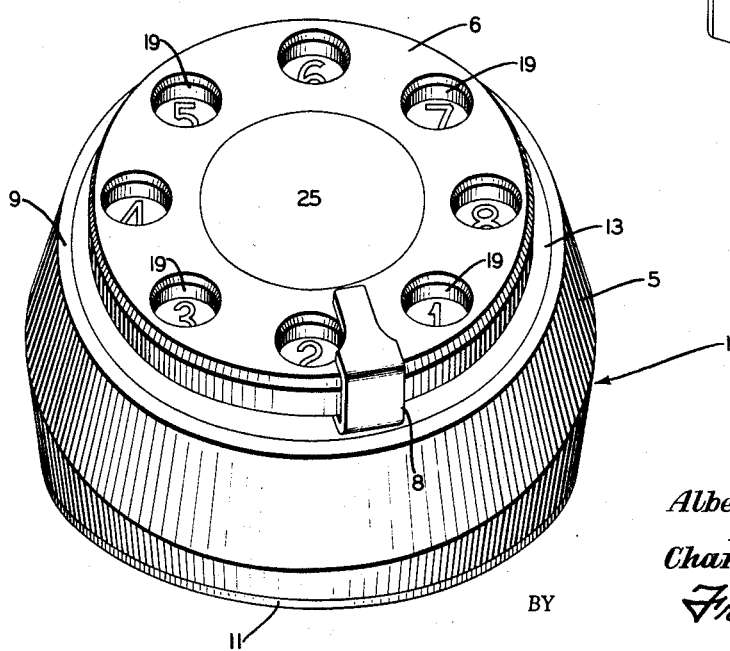
INVENTORS
Albert Little Abbott,
Harry Paulos and
Charles P. Sturgis
BY Frease & Bishop
ATTORNEYS March 15, 1960     A. L. ABBOTT ET AL     2,928,706
DIAL SELECTOR CONSTRUCTION FOR FILING APPLIANCE Filed Jan. 2, 1958            4 Sheets-Sheet 2

INVENTORS
Albert Little Abbott,
Harry Paulos and
Charles P. Sturgis

BY Frease & Bishop

ATTORNEYS

March 15, 1960     A. L. ABBOTT ET AL     2,928,706
DIAL SELECTOR CONSTRUCTION FOR FILING APPLIANCE
Filed Jan. 2, 1958     4 Sheets-Sheet 3

INVENTORS
*Albert Little Abbott,*
*Harry Paulos and*
*Charles P. Sturgis*

BY *Frease & Bishop*

ATTORNEYS

United States Patent Office 2,928,706
Patented Mar. 15, 1960

2,928,706

DIAL SELECTOR CONSTRUCTION FOR FILING APPLIANCE

Albert Little Abbott, Harry Paules, and Charles P. Sturgis, Canton, Ohio, assignors to Diebold, Incorporated, Canton, Ohio, a corporation of Ohio Application January 2, 1958, Serial No. 706,598

8 Claims. (Cl. 312—223)

This invention relates to a filing appliance for storing records in separate categories or groups movable through a continuous orbit of travel, and more particularly it pertains to a dial control for selecting each category of records and bringing the same to an accessible position or opening in the housing of the appliance.

The tendency of business, government agencies, and the like to keep large numbers of active records for various matters has created a need for more efficient methods of handling such records. Initially, the accumulation of increasingly larger numbers of records had resulted in a concentration of active records in smaller space with an inevitable increase in time consumed in locating a particular record. As a result, filing equipment for such records has progressed from the familiar filing cabinet with drawers to rotary filing equipment.

Rotary filing equipment of various types having separate groups of record cards mounted for movement through a continuous orbit of travel are now in existence. The cards are enclosed within a housing having an access window or opening to which any particular group of cards may be successively presented. Thus, record filing equipment has resulted in improved and convenient record handling methods.

Notwithstanding the foregoing, however, the present status of motorized record filing does not include a completely satisfactory automatic rotary file. One type of rotary filing appliance with a plurality of card-carrying trays includes a switch having a number of push buttons corresponding to the number of trays for automatic presentation of any tray at the access position or opening in the housing of the file. For automatic operation, such push button switches necessarily include a rotary switch built in so that the card-carrying trays travel through the shorter route to the access window. A rotary switch herein referred to is a device by which the shorter of two routes of travel is automatically selected. In short, the push buttons do not determine the shortest route but rather are used to select the desired tray and thereby set into operation a number of other electrical parts including the rotary switch for bringing the desired card-carrying tray through the shorter route in its orbit of travel.

One difficulty with push button selector switches having rotary switches in addition to other necessary electrical parts is that they are expensive and thereby add to the cost of the filing appliance. Moreover, the push button type of switch includes additional moving parts which are subject to maintenance and service costs from time to time.

Another difficulty with push button switches is that the installation of such switches in the housing of the filing appliance requires fabrication of the housing which further adds to the cost of the final product.

A further difficulty with the push button type of switch is that it is not always easily adapted for installation on every type of motorized rotary file. In other words, some files do not have a convenient place for locating a push button type of automatic switch.

The device of the present invention is a dial selector switch having a minimum of moving parts and lacking an automatic rotary switch. By providing a dial selector switch, the operator of the file can determine at a glance the shortest route through which the desired tray must travel, for which reason there is no need for an automatic rotary switch of the type described.

By placing upon the operator the choice of determining whether the desired card-carrying tray should travel through the longer or shorter route to the access window, the need for an automatic rotary switch is eliminated. Moreover, by eliminating the rotary switch, a number of other working parts may likewise be eliminated and thereby further minimize the cost of the final product.

Finally, the dial selector switch construction of the present invention may be used as a separate unit connected to the filing appliance merely by an electric cable. Thus a filing appliance having no convenient surface for mounting a stationary switch with aligned push buttons may be adapted for automatic operation simply by installing a dial selector switch.

Accordingly, it is a general object of this invention to provide a motorized filing appliance having completely automatic switch construction for selecting any card-carrying tray in the file.

It is another object of this invention to provide a dial selector switch for a rotary filing appliance in which the operator determines in what direction the desired card-carrying tray will move in its orbit of travel to the access opening in the housing of the filing appliance.

It is another object of this invention to provide a dial selector switch construction for a rotary filing appliance by which the operator can determine at a glance at the face of the dial in what direction to operate the dial to cause the desired card-carrying tray to move through the shorter route in its orbit of travel to the access window in the housing of the filing appliance.

It is another object of this invention to provide a dial selector switch for a rotary filing appliance in which the rotary switch for determining the shorter route of travel for conventional push button switches is eliminated.

It is another object of this invention to provide a dial selector switch for an automatic rotary file in which a minimum of working parts is involved.

It is another object of this invention to provide a dial selector switch for a motorized record filing appliance in which the dial selector switch may be mounted at any convenient location on the housing of the filing appliance.

Finally, it is an object of this invention to provide an improved dial selector switch which accomplishes the foregoing objects and desiderata in a simple, effective, and inexpensive manner.

These and other objects and advantages apparent to those skilled in the art from the following description and claims may be obtained, the stated results achieved, and the described difficulties overcome by the discoveries, principles, apparatus, parts, combinations, subcombinations, and elements which comprise the present invention, the nature of which is set forth in the following statement, a preferred embodiment of which—illustrative of the best mode in which applicants have contemplated applying the principles—is set forth in the following description, and which is particularly and distinctly pointed out and set forth in the appended claims forming part hereof.

The improved dial selector switch construction of the present invention may be stated in general terms as including a dial selector control device for a rotary file having a plurality of record-carrying trays or categories mounted between spaced tray support means for moving the trays in an endless orbit of travel and stopping a selected tray at an access opening in a housing surrounding the trays, a reversible motor operatively connected to the tray support means, the device including a switch having a rotatable shaft, a number of stationary contacts disposed in a circle around the shaft, a dial mounted on the shaft and having a number of finger-engaging means disposed in a circle, the center of which is in the axis of the shaft, a contact-engaging blade on the shaft, a brush operatively connected to the blade, an indexing arm rotatably mounted on the shaft and movable in one direction or another upon movement of the dial by actuation of one of the finger-engaging means, a pair of spaced contact switches separately engageable by the indexing arm, one of the switches being connected to operate the motor in the forward direction and the other switch connected to operate the motor in the reverse direction, a number of limit switches fixedly mounted on the housing and adjacent one of the tray support means, the number of finger-engaging means, of stationary contacts, and of contact switches being equal to each other and to the number of record-carrying trays or categories, each stationary contact being connected to a corresponding limit switch, and means on the assembly of the tray and tray supports for actuating each limit switch during a complete rotation of the assembly.

By way of example, the preferred embodiment of the invention is illustrated in the accompanying drawings, in which Figures 1, 2, and 3 are perspective views of the various types of rotary filing appliances with which the dial selector control device of the present invention may be used;

Fig. 4 is a perspective view of the dial selector control device;

Similar numerals refer to similar parts throughout the drawings.

Figure 6:
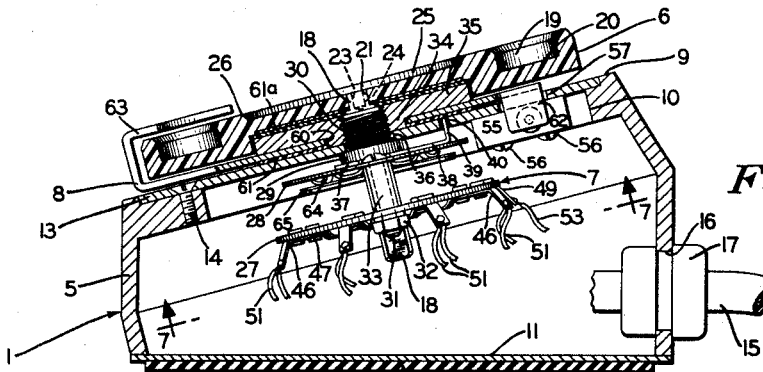
Fig. 6 is a vertical sectional view taken on the line 6—6 of Fig. 5.

As shown in Fig. 4, the dial selector control device is generally indicated at 1. Various types of rotary files 2, 3, and 4 are shown in Figs. 1, 2, and 3, respectively, with the dial selector 1 connected thereto for operation in a manner to be described herein. The dial selector 1 may be used with the various types of motorized filing appliances. For example, the files 2 and 3 have a plurality of record-carrying trays 2a and 3a, respectively; and the file 4 has groups or categories of cards 4a. All of the trays or categories are arranged to move in a continuous orbit of travel within the housing of a filing appliance having an access window or opening where a desired tray or group of records may be brought for observation and handling. Of the various filing appliances 2, 3, and 4 shown by way of example, the file 2 is shown in greater detail in Figs. 8–11 for purposes of illustration.

The dial selector 1 includes a circular housing 5, a dial member 6, a switch 7, and a switch indexing arm or lever 8. The housing 5 is a substantially cylindrical container having an upper inclined surface 9 with a central opening 10 therein. The bottom end of the housing 5 is closed by a circular cover 11 on which a pad 12 of resilient material is attached. The housing 5 is preferably composed of a cast material such as metal. The central opening 10 is covered by a circular plate 13 which is secured to the surface 9 of the housing by a number of spaced screws 14. An electric cable 15 passes through an opening 16 in the housing 5, which opening is provided with a collar 17 of resilient material such as rubber to provide a snug fit for the cable.

The dial member 6 is fixedly mounted on a central rotatable shaft 18 of the switch 7. As shown in Fig. 4, the dial member 6 includes a plurality (preferably eight) of finger-engaging means or recesses 19 in the top surface of the member. The recesses 19 (Fig. 6) extend partially through the dial member 6 and have a bottom wall 20 on which numbers 1 to 8 are inscribed, which numbers refer to correspondingly numbered card-carrying trays 2a and 3a or card categories 4a in the various filing appliances 2, 3, and 4. The dial member 6 includes a central aperture 21 having opposite flat sides 22 to receive the upper end of the rotatable shaft 18 of similar configuration.

In addition, the upper end of the shaft 18 is tapped at 23 to receive a screw 24 which is centrally disposed on a circular insert 25 which fits into a circular recess 26 on the upper side of the dial member 6. The insert 25 holds the dial member 6 on the upper end of the shaft 18. The switch 7 includes an annular plate 27 composed of dielectric material, a support plate 28, a mounting collar 29 having an upper threaded portion 30 of smaller diameter than the collar 29, and the rotatable shaft 18 which extends centrally through the assembly of the switch 7 including the members 27, 28, and 29. The annular plate 27 is secured to the support plate 28 by a pair of diametrically spaced bolts 31 (Figs. 6 and 7) having nuts 32. The spacing between the annular plate 27 and the support plate 28 is maintained by a spacer 33 on each bolt 31.

The upper end of the switch 7 is retained in place by a nut 34 having an enlarged flange 35. When the nut 34 is tightened upon the threaded portion 30, the plate 13 having a central aperture 36 through which the threaded portion 30 extends, is compressed between the nut 34 and the mounting collar 29 to hold the switch rigidly in place beneath the plate 13. The switch 7 also includes an apertured member 37 surrounding the shaft 18 and tightly compressed against rotation between the mounting collar 29 and the support plate 28. The member 37 also includes a radially extending portion 38 having an upturned end 39 which is seated within an aperture 40 in the plate 13. Thus the end 39 of the member 37 prevents the entire switch 7 from rotating in the event the tight fit created on the plate 13 by the nut 34 and collar 9 should slip accidentally.

Figure 7:
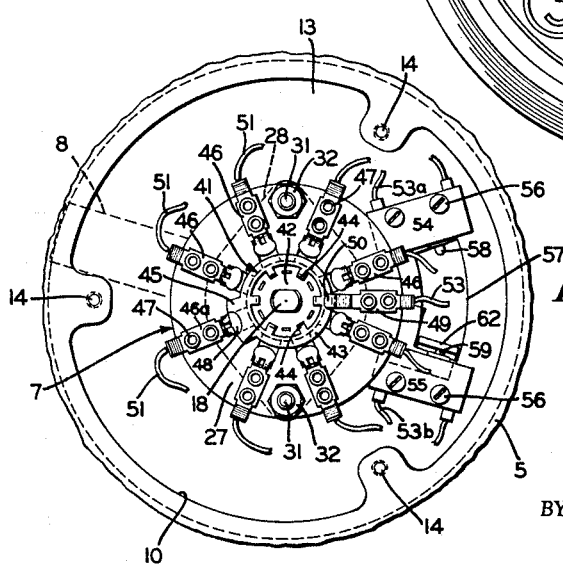
Fig. 7 is a bottom view of the internal portion of the dial selector control taken on the line 7—7 of Fig. 6.

The foregoing members of the switch 7 including the nut 34, the mounting collar 29 with its threaded portion 30, the support plate 28, and the annular plate 27 connected to the plate 28 by the bolts 31 and spacers 33, constitute the stationary members of the switch 7. As shown in Fig. 7, the switch 7 also includes a rotor generally indicated at 41. The rotor 41 includes an annular dielectric member 42 fixedly mounted on the lower end of the shaft 18 and a rotary wiper or annular member 43 composed of electrical conducive material such as metal. The member 43 is fixedly mounted by means of a plurality of radially extending fastening members 44 having inner ends imbedded in the annular member 42. The annular member 43 is rotatably mounted with respect to the plate 27. In addition, the annular member 43 includes a rotor blade 45 extending radially outwardly at one side of the annular member 43.

Moreover, a plurality (preferably eight) of contact clips 46 are radially disposed on the annular plate 27 where they are secured by similar rivets 47. The inner ends 48 of each clip 46 are yieldingly disposed within the path of rotation of the rotor blade 45 with which the ends 48 make separate contact when the switch shaft 18 is rotated through a 360° angle. An additional clip or brush 49 is likewise mounted on the annular plate 27, the inner end 50 of which is in constant contact with the annular member 43 as shown in Fig. 7.

Figure 12:
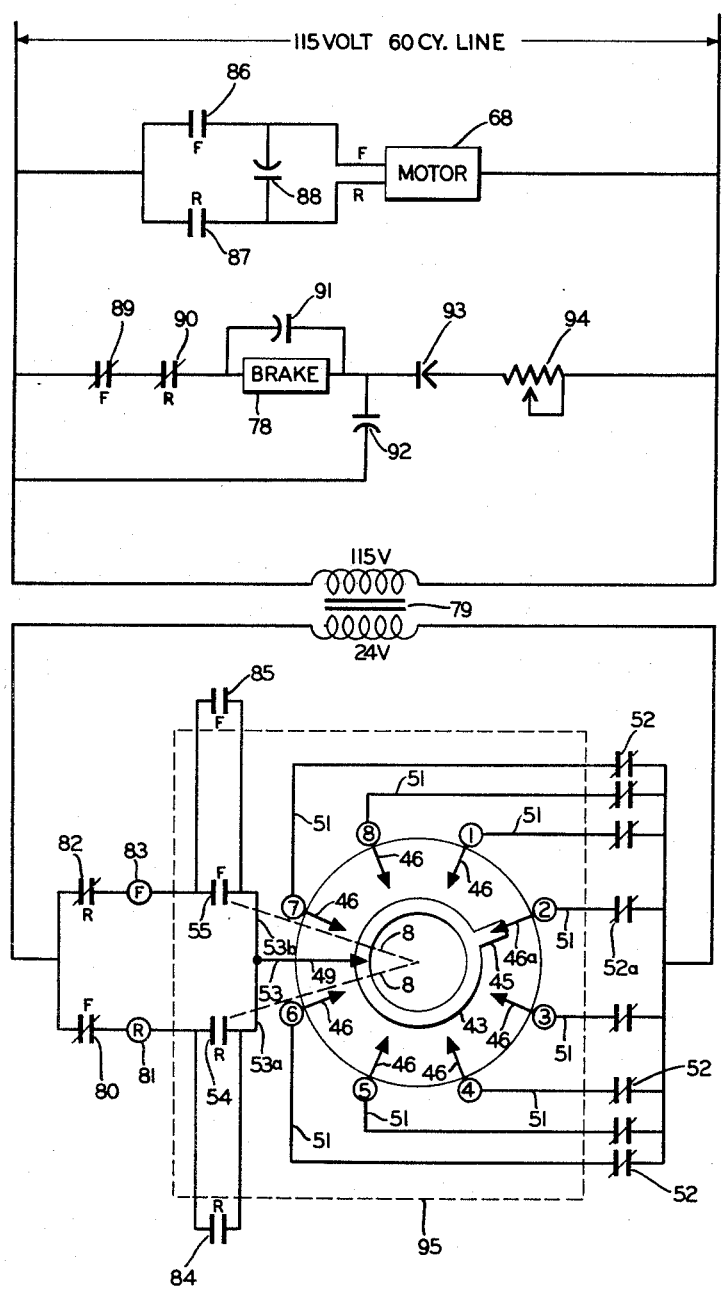
Fig. 12 is a wiring diagram.

The number of clips 46 corresponds to the number of card-carrying trays 2a and 3a or card categories 4a in the filing appliance and also corresponds to the number of finger recesses 19 in the dial member 6. Moreover, a wire 51 leads from the outer extremity of each clip 46 through the cable 15 to a corresponding normally closed limit switch 52 of which there are eight as shown in Fig. 12. In addition, a wire 53 leads from the outer end of the brush 49 to a pair of momentary contact switches 54 and 55 through wire portions 53a and 53b, respectively.

As shown in Figs. 6 and 7, the contact switches 54 and 55 are attached by similar screws 56 to the under surface of the plate 13. The switches 54 and 55 are spaced from each other at opposite ends of an arcuate opening 57 in the plate. The switches 54 and 55 are provided with actuator buttons 58 and 59, respectively, extending beyond the ends of the opening 57.

Referring to Fig. 6, the switch indexing arm or lever 8 is provided with a central opening 60 through which extends the nut 34. In this manner the lever 8 is retained between the upper surface of the plate 13 and the flange 35 of the nut 34 for free rotative movement. A washer 61 is disposed between the lever 8 and the plate 13. A similar washer 61a is disposed between the nut 34 and the dial member 6. Moreover, the lever includes a downturned flange 62 at one end which extends through the arcuate opening 57 in the plate 13 for contact with the actuator buttons 58 and 59. The other end of the lever 8 includes a backturned flange 63 extending around the periphery of the dial member 6 and beyond the circle on which the centers of the finger recesses 19 are disposed.

When a particular card-carrying tray 2a or 3a or card category 4a in the files 2, 3, or 4 is desired, the operator may insert a finger into one of the recesses 19, say the recess identified by number "2," and turn the dial member 6 until rotation is prevented by the finger contacting one side of the flange 63 of the lever 8. If the dial member 6 is rotated counterclockwise, the finger will eventually strike the left side of the flange 63 as shown in solid lines in Fig. 5, causing the flange 62 to strike the actuator button 59 on the normally open contact switch 55 and close the circuit.

Figure 5:
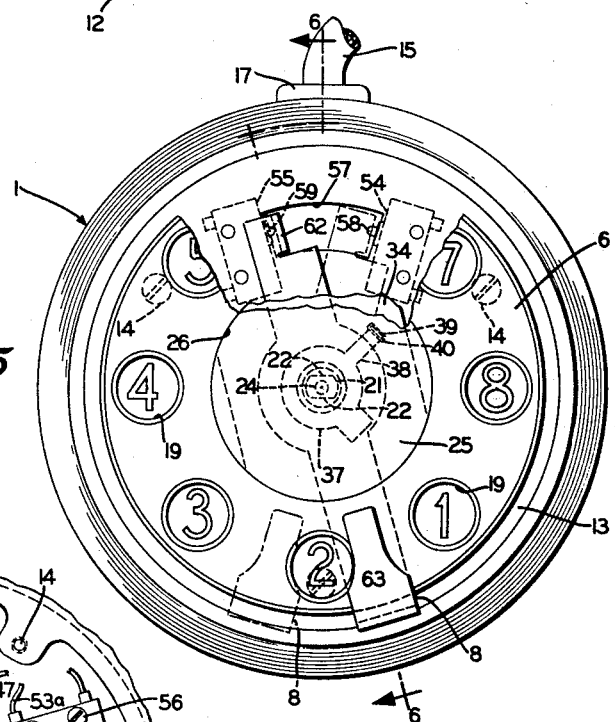
Fig. 5 is a plan view, partly broken away, showing alternate positions of the switch lever.

Likewise, if the dial member 6 is turned clockwise, the finger will eventually strike the right side of the flange 63, as shown in the broken line position of Fig. 5 and cause the flange 62 to strike the activator button 58 of the normally open contact switch 54, whereupon the operating parts within the filing appliance will rotate in the opposite direction from that caused by the switch 55.

Accordingly, the operator may determine in which direction the file will rotate in order to bring the desired card-carrying tray to the access window or opening in the filing appliance. If the dial member 6 is rotated clockwise, the trays will move in one direction and if the member is rotated counterclockwise the trays will move in the opposite direction. Furthermore, the operator can determine the shortest route of travel to bring any desired tray to the access window or opening by merely glancing at the dial member 6. The particular recess 19 located at the flange 63 of the lever 8 indicates the particular tray at the opening and to bring any other tray to the opening the operator need merely rotate the recess 19 indicating the desired tray through the shorter arc to actuate the lever 8 in either direction. In other words, a diagonal line extending through the particular recess 19 at the lower end of the lever 8 divides the dial member 6 into two semicircular segments and if all of the recesses 19 on one side of said diagonal are rotated through their shorter arc to the lower position, as indicated by the particular recess "2" in Fig. 5, the card-carrying trays will move through the shorter route to the access window in the housing of the filing appliance.

The switch 7 includes means for preventing the switch from rotating accidentally or drifting from the particular position set by the operator. Said means includes a plurality of arcuate embossments 64 (Fig. 6) extending below the surface of the stationary support plate 28. A circular member 65 is mounted on the switch shaft 8 and yieldingly contacts the arcuate embossments 64 so that the switch assembly remains at the position to which it is moved when the operator lifts his finger from the recess.

Figure 8:
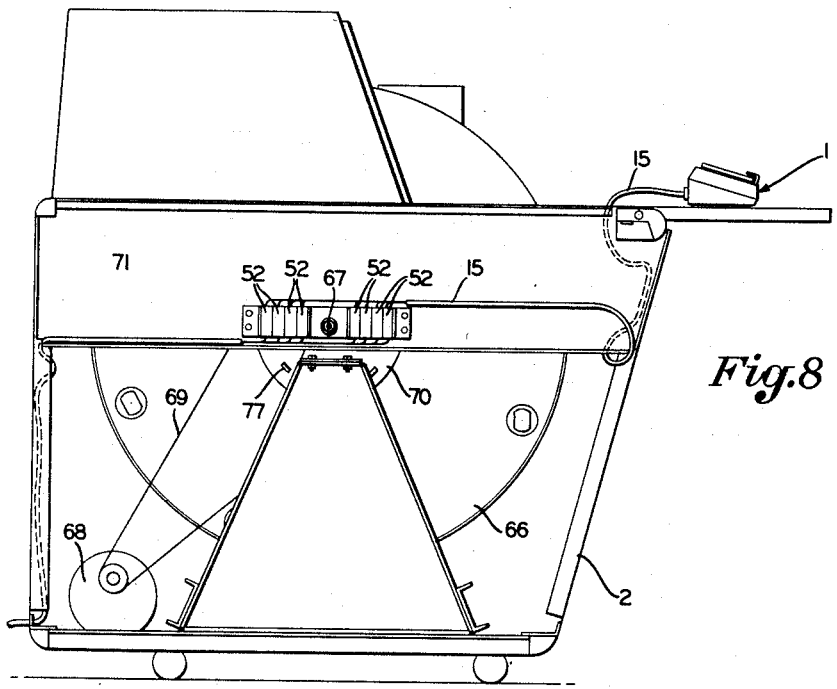
Fig. 8 is a side view of the rotary file shown in Fig. 1 with one side panel removed.

The foregoing switch construction is connected electrically to the limit switches 52 which may be mounted in any one of the filing appliances 2, 3, and 4 substantially in the manner shown for the filing appliance 2 with the side panel removed in Fig. 8. Among other things, the appliance includes a pair of spaced circular support members 66 (Fig. 1) between which the plurality of card-carrying trays 2a are mounted at equally spaced intervals. The support members 66 are mounted on and rotate about a central axis 67 by means of a reversible electric motor 68 connected by an endless chain 69 to a sprocket wheel 70 fixedly attached to one side of one support member 66. The limit switches 52 are mounted in banks of four switches on opposite sides of the central axis 67 as shown more clearly in Figs. 9 and 10.

The switches 52 are mounted on a flanged structural member 71 extending horizontally across one side of the filing appliance 2. Each switch includes an actuator button 72 and a roller 73 which is normally spring-biased away from the button 72 on a leaf spring 74. The flange plate 71 is provided with elongated slots 75 and 76 on opposite sides of the axis 67 through which the rollers 73 in each bank of switches 52 extend toward the facing side of the sprocket wheel 70.

Figure 9:
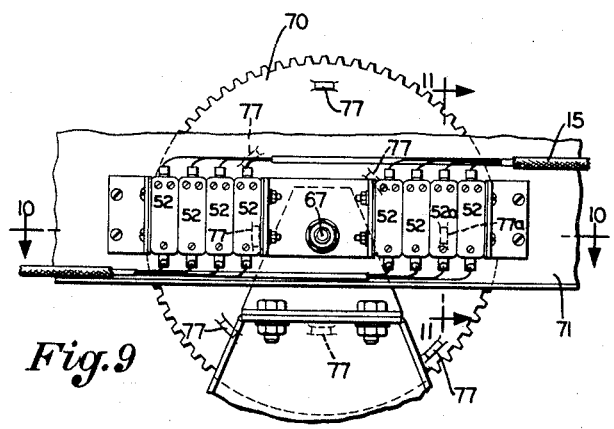
Fig. 9 is a fragmentary enlarged view of the limit switches and corresponding cams on the gear wheel.
Figure 11:
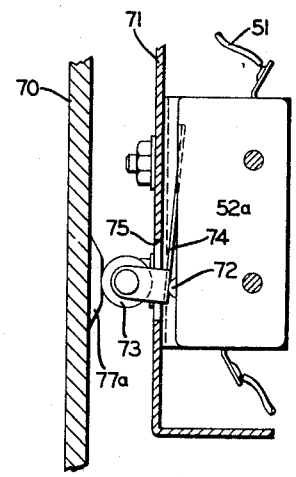
Fig. 11 is a fragmentary enlarged view of a limit switch taken on the line 11—11 of Fig. 9.
Figure 10:
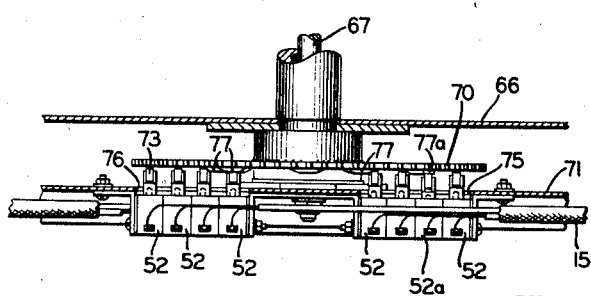
Fig. 10 is a sectional view taken on the line 10—10 of Fig. 9.

As shown in Figs. 9–11, the sprocket wheel 70 is provided with a plurality of spaced cam members 77, one for each switch 52. The sprocket wheel 70 rotates through the same arc as the card-carrying trays 2a. Each cam member 77 is located on the sprocket wheel 70 to correspond with the position of each tray 2a at the access window so that when the particular cam 77a moves the roller 73 on the particular limit switch 52a (Fig. 11) the circuit is broken by the normally open switch 52a, causing the motor 68 to stop and applying a brake 78 (Fig. 12) of the conventional construction to the shaft of the motor so that the desired card-carrying tray 2a stops immediately at the access window.

The wiring diagram for the filing appliances 2, 3, and 4 is shown in Fig. 12 and in addition to the various parts described above, it includes a 24 volt circuit through a transformer 79 and a 115 volt line supply circuit. The latter circuit operates the motor 68 and the brake 78 on the motor shaft. In the 24 volt circuit the contact switch 54 is connected to a relay contact 80 through a relay coil 81. Similarly, the contact switch 55 is connected to a relay contact 82 through a relay coil 83. Like the limit switches 52, the relay contacts 80 and 82 are normally closed. In addition, the contact switches 54 and 55 are provided with relay contacts 84 and 85, respectively, which are normally open.

As shown in Fig. 12, the 115 volt circuit includes a forward relay contact 86, a reverse relay contact 87 which is normally open, and a capacitor 88 leading to the motor 68. Moreover, the circuit for the brake 78 includes a forward relay contact 89, a reverse relay contact 90, both of which are normally closed, capacitors 91 and 92, a rectifier 93, and a rheostat 94.

In operation, when a particular card-carrying tray 2a or 3a or category 4a in one of the filing appliances 2, 3, and 4 is remote from the access window, the operator may rotate the dial member 6 through the shorter arc to the lowermost position of the dial until the indexing arm 8 is moved to its limit to the right or left. Assuming, for example, that tray No. 2 is desired, the corresponding recess 19 identified as "2" is turned until the finger or object inserted therein strikes and moves the flange 63 on the indexing arm 3 to its limit, whereupon the flange 62 strikes the button 59 on the normally open contact switch 55. At the same time, the shaft 18 of the rotary switch 7 moves the rotor blade 45 into contact with the particular clip 46a which is connected to the particular limit switch 52a.

As shown in Fig. 12, all of the switches, relays, and coils are additionally identified by the letters "F" or "R" indicating that they function with the forward or reverse operation of the motor 68. When the limit switch 55, also having the "F" identification, is closed, all other parts having the letter "F" are also activated. Likewise, when the contact switch 54, also identified by "R," is activated, all parts similarly identified by the "R" are activated. Accordingly, when the contact switch 55 is closed, current flows from the transformer through the circuit, energizing the relay coil 83. The relay coil 83, arbitrarily identified with the "F" or forward motion of the motor 68, opens the normally closed relay contacts 80 and 89 and closes the normally open relay contacts 85 and 86, whereupon the brake 78 is released and the motor 68 is activated in a forward direction.

Once the circuit is closed through the contact switch 54 or 55, the dial member may be released because the circuit is shunted through the closed relay contact 84 or 85 and the file once set in motion continues to operate until the circuit is broken by a particular limit switch 52a. When the circuit is broken, of course, all of the relays return to their normally open or closed positions and the file is ready for another operation.

In a similar manner, when the contact switch 54 is actuated, the circuit is closed so that the reverse relay coil 81 opens the normally closed relay contacts 82 and 90 and closes the normally open relay contacts 84 and 87, whereupon the brake 78 is released and the motor 68 rotates in the reverse direction until another limit switch 52 is actuated.

All of the elements of the wiring diagram included within the broken line 95 are enclosed within the housing 5 of the dial selector 1. All other parts of the circuit are located within the housing of the filing appliance.

The construction of the present invention provides a dial selector control switch which is devoid of an automatic rotary mechanism for automatically determining the shorter route of travel of a desired tray. By providing a switch having a circular dial with tray positions shown on the face of the dial, the operator may observe by a preliminary glance the precise position of the desired tray with respect to the tray temporarily located at the access window, and elect thereby in which direction to rotate the dial to cause the tray to move through the shorter route in its orbit of travel to the access window. However, the operator may operate the file in the other direction causing the desired tray to move through the longer route of travel. The positions of the desired tray and the tray momentarily at the access window correspond to the positions of corresponding finger-engaging means on the dial.

The dial selector control switch also includes a minimum of necessary electrical parts as compared with prior push button type of switches in which the push buttons for the card-carrying trays are disposed in a line rather than a circle, thereby reducing the over-all cost of the filing appliance. Moreover, the provision of a separate dial housing obviates the expense of additional fabrication of the housing of the filing appliance for the switch having aligned push buttons. Finally, by providing a separate switch rather than the built-in type, the operator may place the switch at a location which is suitable for his particular aptitude, i.e., a right or left-handed person.

In the foregoing description, certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific mechanisms shown.

Having now described the features, discoveries, and principles of the invention, the construction, operation, and use of the improved mechanisms and the advantageous, new, and useful results obtained thereby; the new and useful parts, elements, constructions, mechanisms, combinations, subcombinations, and arrangements, and mechanical equivalents obvious to those skilled in the art are set forth in the appended claims.

We claim:

1. In rotary file equipment of the type wherein a plurality of record-carrying trays are mounted between spaced tray support means for moving the trays in an endless orbit of travel and stopping a selected tray at an access opening in a housing surrounding the trays, and wherein a reversible motor is operatively connected to the tray support means; the combination of a selector control switch having a rotatable shaft, a number of stationary contacts disposed around the shaft, a dial mounted on the shaft and having a number of finger-engaging means disposed in a circle around the shaft, a blade on the shaft engageable separately with the contacts, a brush operatively connected to the blade, a pair of spaced contact switches separately operative upon rotation of the dial, one contact switch being operative upon rotation of the dial in one direction and the other contact switch being operative upon rotation of the dial in the other direction, one of the switches being operatively connected to the motor for forward operation and the other switch being connected to the motor for reverse operation, a number of limit switches mounted on the housing and adjacent one of the tray support means, the number of finger-engaging means, of stationary contacts, and of contact switches being equal to each other and to the number of card-carrying trays, each stationary contact being connected to a corresponding limit switch, and cam means on the tray support means for engaging each limit switch separately during a complete rotation thereof, whereby actuation of one contact switch operates the motor in one direction and establishes a circuit through one of the contacts and a corresponding limit switch which upon subsequent actuation of said limit switch by one of said cam means breaks the circuit and stops the motor.

2. In rotary file equipment of the type wherein a plurality of record-carrying trays are mounted between spaced tray support means for moving the trays in an endless orbit of travel and stopping a selected tray at an access opening in a housing surrounding the trays, and wherein a reversible motor is operatively connected to the tray support means; the combination of a switch having a rotatable shaft, a number of stationary contacts disposed around the shaft, a dial mounted on the shaft and having a number of finger-engaging means disposed in a circle the center of which is in the axis of the shaft, a blade on the shaft engageable with the contacts separately, a brush operatively connected to the blade, an indexing lever adjacent the dial and extending at one end over the circle of the finger-engaging means and limiting movement of the dial upon actuation by the finger-engaging means, a pair of spaced contact switches separately operative by the indexing lever, one of the switches being operatively connected to the motor for forward operation and the other switch being connected to the motor for reverse operation, a number of limit switches mounted on the housing and adjacent one of the tray support means, the number of finger-engaging means, of stationary contacts, and of contact switches being equal to each other and to the number of record-carrying trays, each stationary contact being connected to a corresponding limit switch, and cam means on the tray support means for engaging each limit switch separately during a complete rotation thereof, whereby actuation of one contact switch operates the motor in one direction and establishes a circuit through one of the contacts and a corresponding limit switch which upon subsequent actuation of said limit switch by one of said cam means breaks the circuit and stops the motor.

3. In rotary file equipment of the type wherein a plurality of record-carrying trays are mounted between spaced tray support means for moving the trays in an endless orbit of travel and stopping a selected tray at an access opening in a housing surrounding the trays, and wherein a reversible motor is operatively connected to the tray support means; the combination of a switch having a rotatable shaft, a number of stationary contacts disposed around the shaft, a dial mounted on the shaft and having a number of finger-engaging means disposed in a circle the center of which is in the axis of the shaft, a blade on the shaft engageable with the contacts separately, a brush operatively connected to the blade, an indexing lever rotatably mounted on the shaft and having one end portion extending over the circle of the finger-engaging means on the dial, a pair of spaced contact switches separately operative by the indexing lever, one of the switches being operatively connected to the motor for forward operation and the other switch being connected to the motor for reverse operation, said end portion of the lever stopping continued movement of the dial beyond the point where the finger-engaging means corresponding to the selected tray is adjacent said lever end portion, a number of limit switches mounted on the housing and adjacent one of the tray support means, the number of finger-engaging means, of stationary contacts, and of contact switches being equal to each other and to the number of record-carrying trays, each stationary contact being connected to a corresponding limit switch, and cam means on the tray support means for engaging each limit switch separately during a complete rotation thereof, whereby actuation of one contact switch operates the motor in one direction and establishes a circuit through one of the contacts and a corresponding limit switch which upon subsequent actuation of said limit switch by one of said cam means breaks the circuit and stops the motor.

4. In rotary file equipment of the type wherein a plurality of record-carrying trays are mounted between spaced tray support means for moving the trays in an endless orbit of travel and stopping a selected tray at an access opening in a housing surrounding the trays, and wherein a reversible motor is operatively connected to the tray support means; the combination of a rotatable selector switch means for selecting a particular tray, rotary dial means for actuating the switch means and having finger-engaging means, a pair of spaced contact switches selectively operable to rotate the motor in the forward and reverse directions, an indexing lever adjacent the dial and adapted to selectively actuate the spaced contact switches, limit switch means for breaking the circuit through the motor, cam means associated with the tray support means for actuating the limit switch means when the particular tray reaches the access opening, the rotary selector switch means and limit switch means each having a contact for each tray, the dial having an indexing position for each tray, and electric connections between the contacts of the selector switch means, the limit switch means, the motor, and the contact switches.

5. In rotary file equipment of the type wherein a plurality of record-carrying trays are mounted between spaced tray support means for moving the trays in an endless orbit of travel and stopping a selected tray at an access opening in a housing surrounding the trays, and wherein a reversible motor is operatively connected to the tray support means; the combination of selector switch means having a separate contact for each tray, limit switch means for breaking the circuit through the motor, cam means associated with the tray support means for actuating the limit switch means when the particular tray reaches the access opening, a pair of spaced contact switches selectively operable, one contact switch operating the motor in the forward direction and the other contact switch operating the motor in the reverse direction, manually actuated dial means for selecting a particular tray, the dial means being rotatable in either direction to an operative position, an indexing lever adjacent the dial means and located at said operative position, the indexing lever being movable in one direction to actuate one of said contact switches and being movable in the other direction to actuate the other of said contact switches, the selector switch means and the limit switch means each having a contact for each tray, the dial having an indexing position for each tray which position corresponds to one of the contacts on the selector switch means, and means electrically connecting the motor, the selector switch means, the contact switches, and the limit switch means.

6. The construction as set forth in claim 5 in which a normally applied electrically releasable brake for the motor shaft is associated with the motor, whereby breaking of the circuit by one of the limit switches applies the brake to the shaft of the motor.

7. The construction as set forth in claim 5 in which the electrical connecting means include first and second normally open relays having contacts connected in parallel with each other to the motor, the first relay being actuable for operating the motor in the forward direction and the second relay being actuable for operating the motor in the reverse direction, third and fourth normally closed relays having contacts connected in series to the brake, the third and fourth relays being separately operable for releasing the brake, fifth and sixth normally closed relays having contacts associated with each contact switch, and a relay coil associated with each contact switch, whereby operation of one of the contact switches energizes the corresponding relay coil to actuate the contacts of the first, third, and fifth relays and operation of the other contact switch energizes the other relay coil to actuate the contacts of the second, fourth, and sixth relays.

8. In rotary file equipment of the type wherein a plurality of record-carrying trays are mounted between spaced tray support means for moving the trays in an endless orbit of travel and stopping a selected tray at an access window in a housing surrounding the trays, and wherein a reversible motor is operatively connected to the tray support means; the combination of rotatable selector switch means for selecting a particular tray and including a rotary dial having finger-engaging means, the dial being rotatable in one direction for operating the reversible motor in the forward direction and the dial being rotatable in the other direction for operating the motor in the reverse direction, a pair of spaced contact switches in the switch means, one contact switch being actuated upon rotation of the dial in one direction and the other contact switch being actuated upon rotation of the dial in the other direction, indexing lever means adjacent the dial for actuating one of the contact switches in response to rotation of the dial in either direction, a number of contacts circularly spaced on the switch means, blade means separately engageable with the contacts upon rotation of the dial, a number of limit switches mounted on the housing and adjacent one of the tray support means, the number of finger-engaging means, of stationary contacts, and of contact switches being equal to each other and to the number of record-carrying trays, each stationary contact being connected to a corresponding limit switch, and cam means on the tray-support means for engaging each limit switch separately during a complete rotation thereof, whereby actuation of one contact switch operates the motor in one direction and establishes a circuit through one of the contacts and a corresponding limit switch which upon subsequent actuation of said limit switch by one of said cam means breaks the circuit and stops the motor.

References Cited in the file of this patent

UNITED STATES PATENTS

| | | |
|---|---|---|
| 2,405,628 | Yardeny | Aug. 13, 1946 |
| 2,504,629 | Bertello | Apr. 18, 1950 |
| 2,727,570 | Hempel | Dec. 20, 1955 |
| 2,794,162 | Lifsey | May 28, 1957 |
| 2,816,259 | Papitto | Dec. 10, 1957 |
| 2,823,345 | Ragland et al. | Feb. 11, 1958 |

FOREIGN PATENTS

| | | |
|---|---|---|
| 477,634 | Italy | Jan. 28, 1953 |